2,666,246

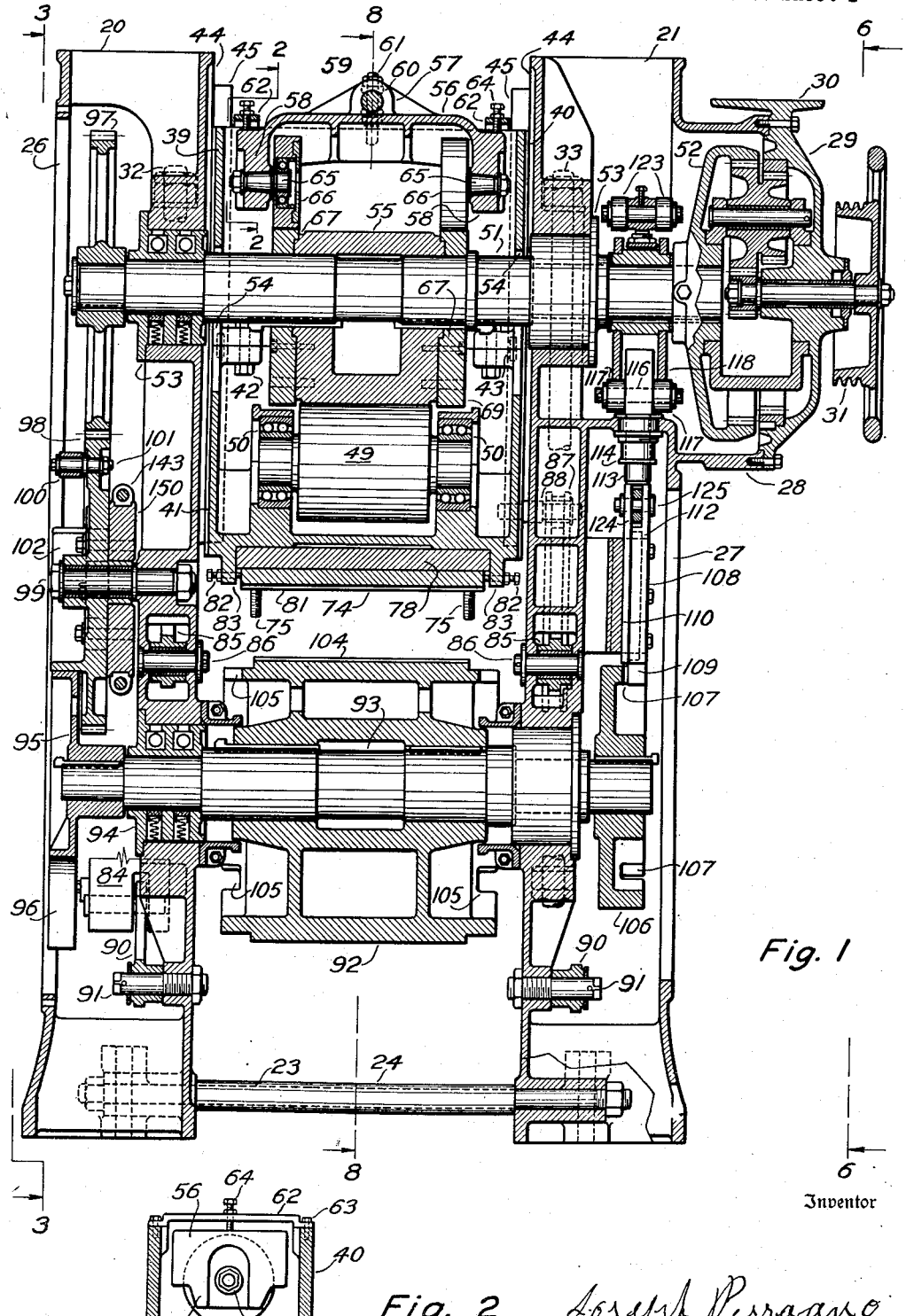

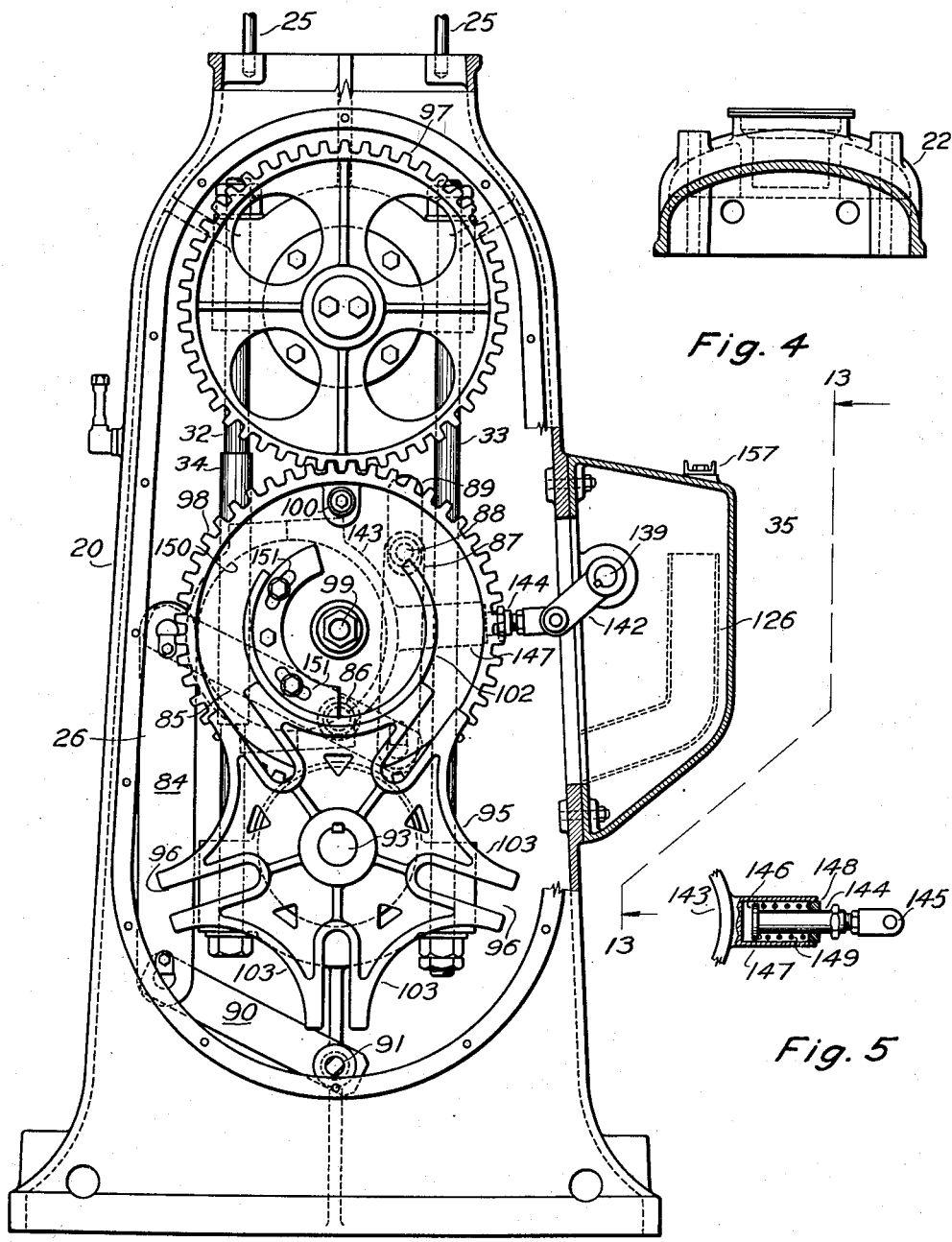

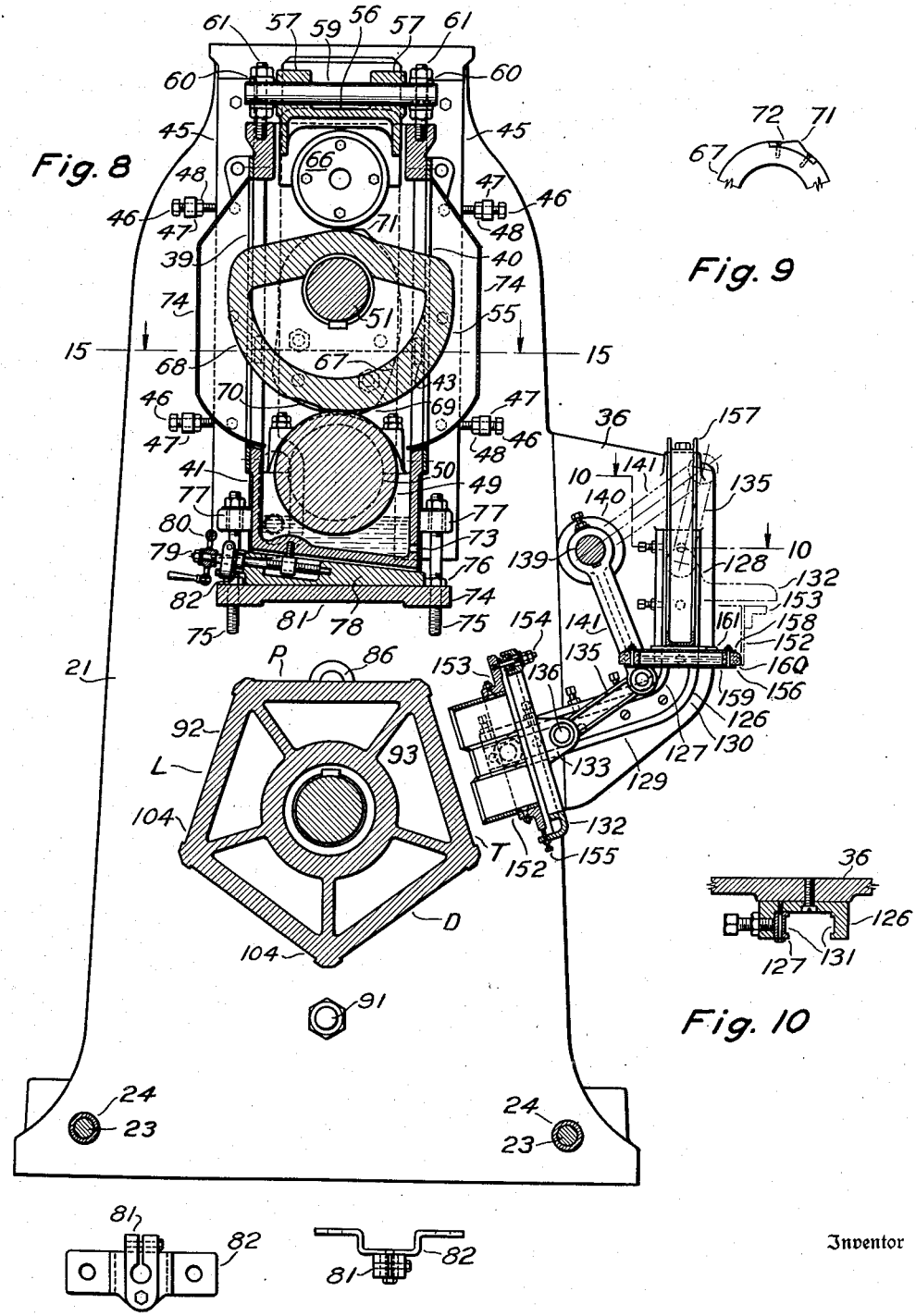

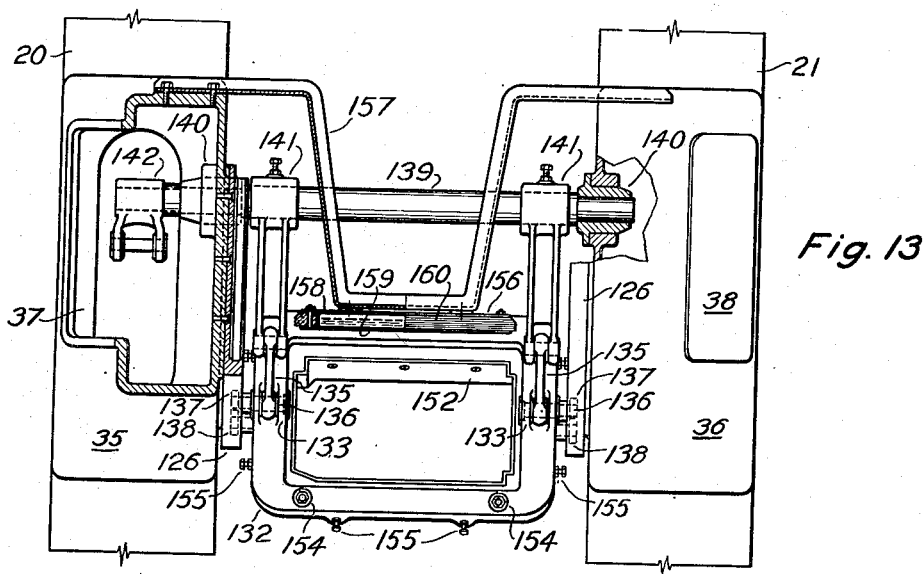
Fig. 13
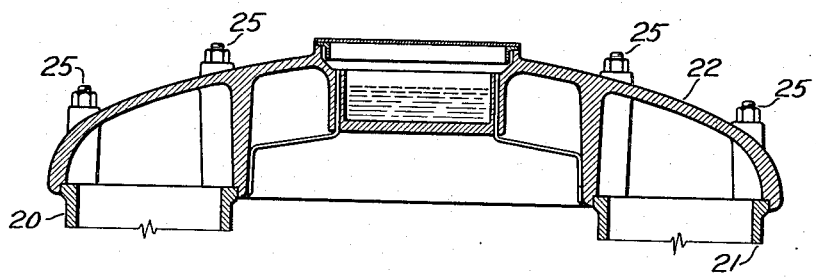
Fig. 14
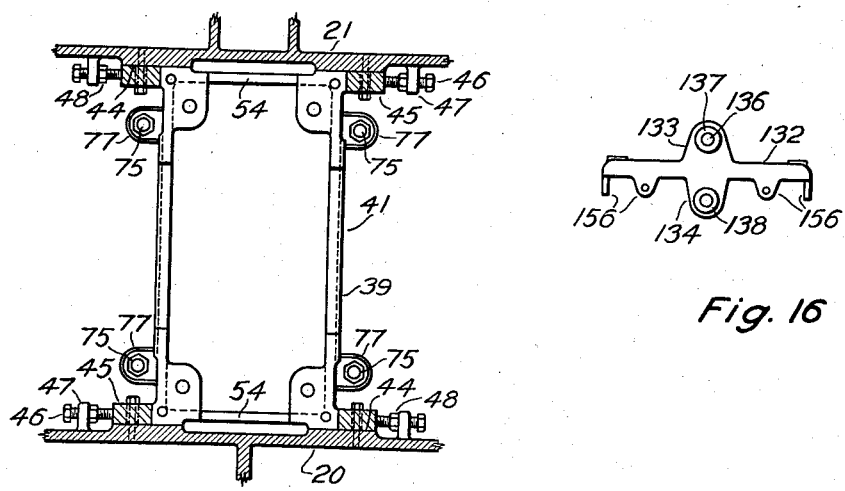
Fig. 15
Fig. 16
Inventor
Joseph Pessagno Patented Jan. 19, 1954

UNITED STATES PATENT OFFICE 2,666,246

TILE MOLDING MACHINE

Joseph Pessagno, Niles, Calif.

Substituted for abandoned application Serial No. 25,147, May 5, 1948. This application May 31, 1952, Serial No. 290,860

2 Claims. (Cl. 25—42)

This application is a substitute for my forfeited application, Serial No. 25,147, filed May 5, 1948.

This invention relates to improvements in tile molding machines, and has for its principal object the provision of a machine adapted to the accurate and rapid production of tiles of uniform shape and consistency.

A further object of the invention is the provision of a machine having novel means of adjustment, for maintaining accurate alignment and relationship of its cooperating parts.

A further object of the invention is the provision of a machine in which the moving parts are adequately balanced, in order to eliminate any undue load on the driving mechanism.

A still further object of the invention is the provision of a machine having an interrupted pressing action adapted to ensure a non-porous product.

A still further object of the invention is the provision of a machine having self-cleaning, tile trimming means.

The above and other objects will become apparent during the course of the following description, taken in connection with the accompanying drawings, forming a part hereof, and in which:

Figure 1 is a vertical section coincident with the longitudinal median plane of the machine.

Figure 2 is a fragmentary section taken on line 2—2 of Figure 1.

Figure 3 is an end elevation as viewed from line 3—3 of Figure 1, parts being broken away, and other parts being shown in section.

Figure 4 is a sectional view of the crown of the machine, and is complementary to Figure 3.

Figure 5 is a fragmentary detail of the eccentric strap and its connection.

Figure 8 is a vertical section taken on line 8—8 of Figure 1.

Figure 9 is a fragmentary detail of the press lifting cam.

Figure 10 is an enlarged section taken on line 10—10 of Figure 8.

Figure 11 is an enlarged front elevation of the adjusting spindle locking device.

Figure 12 is a top plan view of the device illustrated in Figure 11.

Figure 13 is an elevation as viewed from line 13—13 of Figure 3, parts being broken away, and other parts shown in section.

Figure 14 is a longitudinal vertical section of the crown of the machine, and is complementary to Figure 1.

Figure 15 is a horizontal section taken on line 15—15 of Figure 8.

Figure 16 is an enlarged end elevation of the knife supporting frame.

Figures 6, 7:
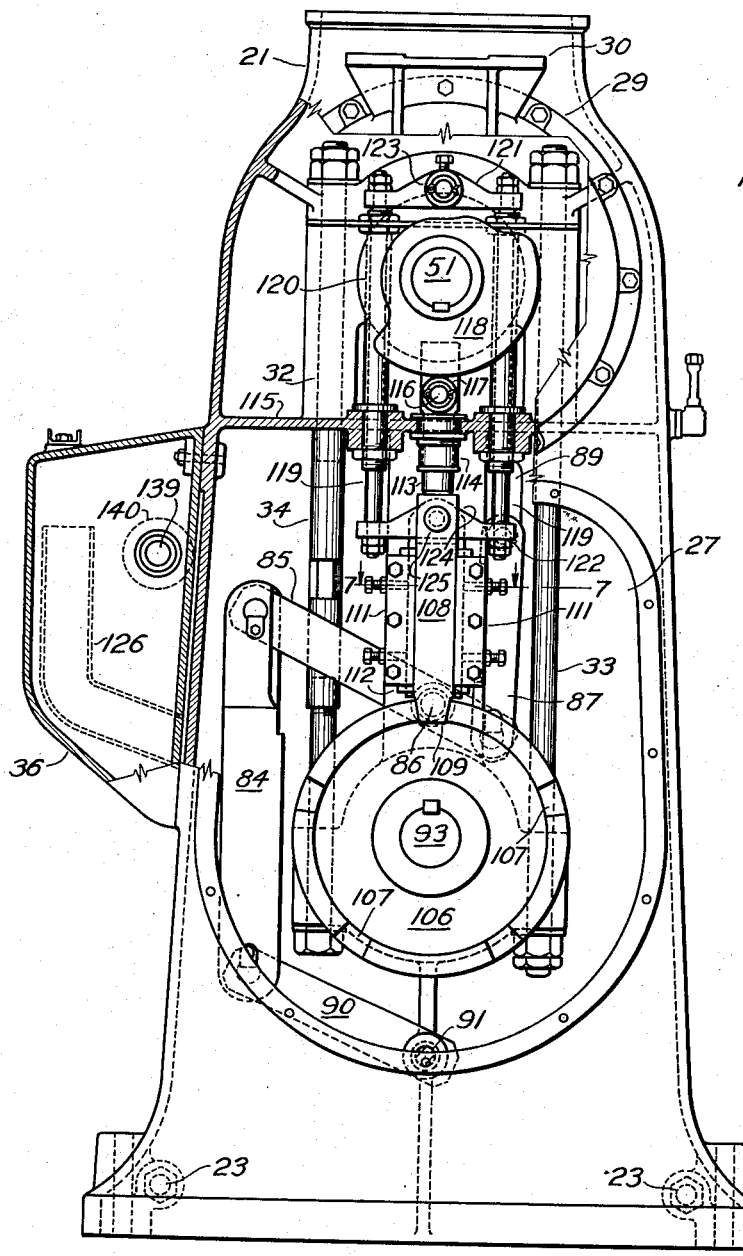
Figure 6 is an end elevational as viewed from line 6—6 of Figure 1, parts being broken away, and other parts shown in section.
Figure 7 is a fragmentary section taken on line 7—7 of Figure 6.

Referring to the drawings in detail, it will be seen that all of the parts of the device are supported or housed by opposed columns 20 and 21, which are maintained in spaced and aligned relationship by a crown casting 22 and tie rods 23, complete with spacers 24. The crown casting 22 bridges columns 20 and 21, fits snugly over the upper ends thereof, and is firmly secured thereto by means of studs 25, as is clearly indicated on Figure 14. The tie rods 23, with spacers 24, are arranged in horizontal coplanar and parallel relationship, adjacent to the base of the columns 20 and 21.

Columns 20 and 21, which are shell type castings, are provided with inspection openings 26 and 27 respectively, these openings being normally closed by sheet metal covers, not indicated. Column 21, adjacent its upper end, is constructed with a horizontally projecting annular section 28, which in cooperation with an attached cover 29, forms the housing for a reduction mechanism by means of which the machine is driven.

As the reduction mechanism, which is of the compound epicyclic type, is well known, no useful purpose will be served by further describing it herein. A shelf 30 is provided on the cover 29 for supporting a motor, not shown, which furnishes motive power for the machine through belted connection with pulley 31.

The columns 20 and 21 are relieved of any undue stress, during operation of the machine, by means of vertically disposed tie rods 32 and 33 which are attached to upper and lower portions of the columns, and are given an initial stress at assembly. One tie rod 32, in each of the columns, is made in two sections, having a centrally disposed threaded sleeve 34. This arrangement facilitates adjustment, and assembly and dismantling of the machine.

Columns 20 and 21 are further provided with laterally extending housings 35 and 36 respectively, which are detachably mounted thereon, and serve to mount and house the tile trimming mechanism of the machine. The housings 35 and 36 are disposed in spaced and aligned relationship relative to one another. Inspection openings 37, closed by sheet metal covers 38, are provided in the housings 35 and 36.

The machine as a whole comprises a number of cooperating sub-assemblies, each of which will be described in turn.

Reciprocating press

The reciprocating press comprises a rectangular box shaped member 39 consisting of upper and lower attached sections 40 and 41 respectively. The press is constructed in sections for assembly purposes, and is secured together, in accurate alignment, by mean of bolts 42 and dowels 43. The press 39 is adapted to reciprocate between columns 20 and 21, axially coincident with a median vertical plane between the columns, and centrally disposed relative to a vertical center line thereto. It is held in place laterally by the contiguous restraining surfaces 44 of the columns 20 and 21, and is maintained in alignment longitudinally by means of guides 45, bolted to the surfaces 44. In order to compensate for wear, and maintain accurate alignment, guides 45 are provided with adjusting screws 46, which engage lugs 47 on the columns 20 and 21, and which are locked at adjustment by nuts 48.

A horizontal roller 49, axially coincident with the longitudinal vertical median plane of the press 39, is rotatably mounted intermediate the bottom of the lower section 41 by means of ball bearing 50. A main drive shaft 51 operably connected to the aforementioned gear reduction mechanism by ring gear 52, is rotatably mounted between, and supported by aligned bearings 53 fitted adjacent the upper ends of columns 20 and 21. Shaft 51 passes through, and is coincidental with the vertical center line of press 39. Vertically elongated clearance openings 54, are provided in press 39, to allow unrestricted rotation of the shaft 51 and reciprocating motion of the press. A pressing cam 55, fixedly mounted on shaft 51, is adapted to engage roller 49 as will be described herein.

Suspended within the walls of the upper sections 40 of the press 39, adjacent the top thereof, is a lifting roller support 56. Support 56 comprises a casting having a pair of aligned, upstanding mounting lugs 57, and a pair of aligned, depending, roller supporting flanges 58, axially perpendicular to the lugs 57. A shaft 59, passing through lugs 57, is adjustably mounted by means of clamps 60 and studs 61 to opposite walls of the press 39, as is clearly indicated on Figure 8.

Pivotal movement of the support 56 is prevented by means of straps 62 which extend in spaced and parallel relationship across the top of section 40 as can be seen on Figures 1 and 2, and which are disposed one on either side of and parallel with, shaft 59. Straps 62 are secured to the section 40 by means of belts 63, and set screws 64, passing through the center of the straps 62, bear firmly against the support 56, and preclude any tendency of the latter to pivot on the axis of shaft 59.

It will be apparent that with the afore-described mounting arrangement, vertical adjustment of support 56, relative to press 39, can be readily effected. Rotatably mounted in opposed and aligned relationship, on the inner faces of flanges 58, by means of trunnions 65, are a pair of identical lifting rollers 66. A pair of lifting cams 67 disposed one on either side of cam 55, and doweled and bolted thereto, are arranged for rotation therewith, and are adapted to cooperate with rollers 66.

During the revolution of the shaft 51, and the fixedly mounted cams 55 and 67, the press 39 will be urged in a downward direction during that part of the cycle when the radially extended portion 68, of cam 55, is in contact with the roller 49, and will then be urged in an upward direction by contact of the radially extended portion 69 of the identical cams 67 with the rollers 66. The contours of the cams 67 and the cam 55 are so formed as to provide perfect synchronization of their related functions.

It will be noted on Figure 8 that the portion 68 of the cam 55 is provided with a recess 70, adapted to interrupt the downward travel of the press 39, and also that diametrically opposed to this recess, the lifting cams 67 are provided with a projecting point 71, adapted to momentarily reverse the downward travel of the press 39. The point 71 is preferably provided by a hardened steel insert 72, as shown on Figure 9 as this part is subjected to undue wear. The purpose of this feature will be described with the operation of the machine.

The roller 49 is provided with an oil bath as shown on Figure 8, and an aperture 73 is fitted with an oil level indicator, which has been omitted from the drawing in the interest of clarity. Inspection covers 73' preclude the entrance of dust or other extraneous matter from entry into the interior of the press 39.

Upper die attachment

The upper die, which has not been indicated on the drawings, is attached to a plate 74 by means of four downwardly projecting studs 75. The studs 75 engage tapped holes in the plate 74 and are locked therein by means of lock-nuts 76. Extending upwardly, the studs 75 pass loosely through lugs 77, projecting from the sides of the press 39, as shown on Figures 8 and 15, and provide a means of vertical adjustment and prevent downward displacement of the plate 74. Interposed between the upper surface of the plate 74, and the lower surface of the press 39, which is machined at an acute angle to the horizontal, is an adjustable complementary wedge 78 which is manipulated by means of a spindle 79 complete with hand wheel 80. The spindle can be locked against inadvertent operation by means of a clamp 79', which fits over the spindle and is prevented from turning by being secured to the spindle collar bracket 80', which in turn is secured to the end of the wedge 78.

A machined recess 81, in the lower surface of the plate 74, ensures accurate alignment of the upper die laterally, while set screws 82 passing through wedge guide flanges 83, on press 39, provide longitudinal adjustment.

By manipulation of the wedge and its related adjusting elements, tiles of various selected weights or thicknesses can be produced.

Counterbalancing mechanism

In order to ensure smoothness of operation, the weight of the reciprocating press has been counterbalanced by means of a pair of weights 84, mounted for movement within the columns 20 and 21. One weight is mounted in each column, and as their functions are identical, one description will cover both.

A lever 85 pivotally mounted on a centrally disposed pin 86, in its respective column 20 and 21, is pivotally attached at its longer end to the upper end of the weight 84. The short end of the lever 85 is pivotally attached to the lower end of a pitman 87 which in turn has its upper end pivotally attached to the press 39 by means of a stud 88. A vertically elongated slot 89, through the wall of the column, allows for unrestricted motion of the stud 88.

Movement of the lower end of the weight 84 is controlled by pivotal connection with a link 90 which in turn is pivotally mounted on the column by means of a stub shaft 91.

It will be apparent that as the lever 85 has its fulcrum between the connecting points with weight 84 on one side, and the pitman 87 and press 39 on the other side, the directions of travel of the weight and press will always be in a reverse direction relative to one another.

*Lower die holder*

The lower die holder comprises a drum 92 having a section of polygonal form, fixedly mounted on a rotatable shaft 93 which is journaled in bearings 94 similar to bearings 53. Shaft 93 is situated below shaft 51 and is parallel to and vertically coplanar therewith. Housed within column 20, and fixedly mounted on the protruding end of shaft 93 is a Geneva wheel 95 having operating slots 96, equal in number to the sides of the polygonal drum 92, the axis of the slots 96 being radially coincident with the longest radial dimensions of drum 92. Also housed within the column 20 is a gear 97 which is fixedly mounted on the protruding end of shaft 51 and which meshes with a second gear 98 of the same pitch diameter. Gear 98 is rotatably mounted on a stub shaft 99 fixedly secured in the column 20, intermediate shafts 51 and 93 and parallel to and in vertical alignment therewith.

A roller 100, journaled on a stub shaft 101 projecting from the outer face of gear 98, is adapted to successively engage the slots 96 of the wheel 95 and impart intermittent motion thereto. An interrupted, concentric annular flange 102 extending outwardly from gear 98 is adapted to successively engage a plurality of arcuate sections 103 which extend between the slots 96, and are complementary to the flange 102. When the roller 100 engages a slot 96, the gap in the flange 102 allows the wheel 95 to turn.

It will be apparent from the foregoing that with each revolution of the shaft 51, and therefore with each stroke of the press 39, a side of the drum will be presented in parallel relationship to plate 74.

The lower dies, not shown, are contained in recesses 104 in the faces of the drum 92, and are bolted thereto. Slots 105, in the ends of the drum 92 facilitate the ready removal of the dies.

*Drum locking mechanism*

While the engagement of flange 102 with the arcuate portions 103 of the wheel 95 prevents turning of the latter, a small amount of backlash is bound to occur. This back-lash is detrimental to the production of uniform tiles, and must be prevented. I accomplish this by providing a positive locking device which absolutely precludes any movement of the drum 92 during the pressing or molding operation.

Housed within the column 21, and fixedly mounted on the protruding end of shaft 93 is a flanged locking wheel 106. Tapered slots 107 are cut in the flange of the wheel 106, and are equal in number and in diametrically opposed radial alignment with the slots 96 in the wheel 95. Mounted in vertical radial alignment with the wheel 106 is a locking bar 108, having its lower end 109 formed complementary to the slots 107, and adapted for successive engagement and disengagement therewith. The bar is slidably mounted upon a vertically disposed plane surface 110 on the column 21 and is restrained by guides 111 bolted thereto, which permit of its vertical reciprocal motion. Guide liners 112 are provided to compensate for wear.

The locking bar 108 is actuated downwardly by a push-rod 113 adapted to slide in a bushing 114, and which has its lower end in contact with the upper end of the bar. The bushing 114 is securely mounted in a transverse web 115 extending across the inside of the column 21. A pin 116 extends through the upper portion of the push-rod 113, and has mounted, one on either end, a pair of identical rollers 117. Twin cams 118, fixedly mounted on shaft 51, straddle the upper end of the push-rod 113 and engage the rollers 117.

Upward motion of the locking bar 108 is effected by a pair of pull-rods 119, slidably mounted in sleeves 120, and connected at their upper and lower ends by yokes 121 and 122 respectively. The upper yoke 121 carries a second pair of cam engaging rollers 123 similar to rollers 117, while the lower yoke passes through the bifurcated end 124 of the locking bar 108, and is attached thereto by means of a pin 125 which passes through both members.

It will be apparent from a study of Figure 6 that during a part of the cycle of the cams 118, push-rod 113 will maintain the locking bar 108 in one of the aligned slots 107, and as the cam continues to revolve, the push-rod will be released and the pull-rods 119 will be actuated by contact between the cams 118 and the rollers 123, thereby leaving the drum 92 free to revolve under the impetus of its actuating members.

*Trimming mechanism*

During the molding operation a quantity of surplus clay is squeezed from between the dies, and this material must be removed before the formed product is sent to the kiln. I do this automatically by means of mechanism operated in synchronized relationship with the other functions of the machine.

Mounted in opposed relationship on the adjacent outer walls of housings 35 and 36 are a pair of matched roller tracks 126, fitted with wear compensating liners 127. The tracks, which are in coplanar relationship have a section 128 which extends in a vertical path. A second section 129 follows a path which is radial to one of the faces of the drum 92 when its adjacent face is in the horizontal position as shown on Figure 8. The transition from one path to the other is effected by a relatively easy curve 130. The track 126 is of channel section, as can be seen on Figure 10, and roller receiving grooves 131 are cut into the inner facing sides of the track and liner.

Mounted between the tracks, perpendicular thereto, is a knife supporting frame 132, of rectangular form, having two pair of lugs 133 extending from the upper side thereof, and a single pair of opposed lugs 134 depending from the lower side. A pitman 135 is pivotally mounted between each pair of the upper lugs 133 by means of pins 136, which carry on their outer projecting ends, track engaging rollers 137. A second pair of track engaging rollers 138 is carried by the lower lugs 134. As the alignment between the rollers 137 and 138 is perpendicular to the frame 132 it will be apparent that the frame will always be in perpendicular relationship to that portion of the track contained between the said pair of rollers. At one end of its stroke it will occupy the position indicated in solid lines on Figure 8, while at the other extremity it will occupy the position indicated in phantom thereon.

An oscillatory shaft is mounted in, and extends between the housings 35 and 36, being journaled in bearings 140. A pair of spaced and aligned cranks 141, fixedly mounted upon shaft 139, are pivotally connected at their free ends to the upper ends of the pitmans 135. Contained within housing 35 and fixedly mounted on the protruding end of shaft 139, is a clevised crank 142 which is resiliently and operably connected to an eccentric strap 143. Details of the resilient connection, which are shown on Figure 5 comprise an adjustably extensible rod 144 having an eye 145 on the clevis connecting end, and a spring contacting shoulder 146 on the eccentric strap end. The shoulder 146 is housed within a hollow extension 147 of the strap 143. A threaded bushing 148 having a compression spring 149 between it and the shoulder 146, completes the assembly. It will be obvious that as the eccentric strap moves away from the clevis, the spring will effect a yielding pull upon the rod 144.

The strap 143 is mounted on, and actuated by, an eccentric sheave 150 which is bolted to, and driven by the gear 98. Elongated slots 151 in the gear 98 allow for a certain amount of angular adjustment between the eccentric sheave 150 and the gear, this provision assuring timed relationship for tiles of different thicknesses requiring different knife settings.

The trimming knife 152 is resiliently and adjustably mounted on the frame 132 by means of an attaching flange 153. Spring enclosed studs 154 resiliently connect the flange 153 and the frame 132, and set screws 155, engaging lugs 156 on the frame 132, maintain the knife 152 in aligned relationship with the lower dies.

The frame 132 is symmetrical about both center lines as can be seen from Figure 13; in Figure 8, however, the section has been taken through a connecting stud 154 on the upper half, while on the lower half, the section plane intersects one of the lugs 156.

The resilient mounting of the knife 152, and the resilient connection between the crank 142 and eccentric strap 143, ensure a positive cutting action while precluding any destructive pressure between the knife and the die.

Knife cleaning device

Each time a tile is trimmed, a certain amount of clay may adhere to the knife. This material must be removed before the next trimming operation. This is accomplished by means of a stationary cleaning and oiling pad 156 which is mounted on a channel iron frame 157 bridging the space between the housings 35 and 36.

The pad 156 is situated directly in the path of the knife 152 which upon reaching the upper extremity of its travel, as shown in phantom on Figure 8, completely surrounds it, any surplus material, therefore, which may be adhering to the knife, is pushed free and falls below. A second function of the pad 156 is to oil the knife at each contact therewith, and thus minimize the tendency of the clay to be picked up thereby. The pad 156 consists of upper and lower plates 158 and 159 respectively, separated by layers of felt 160 which are cut to form a hollow space in the center into which the oil is introduced by means of a filler plug 161. The oil maintains the felt 160 in a saturated condition which ensures a clean knife on each trimming stroke.

Operation

With reference to Figure 8, a slab of clay is deposited upon each lower die on the drum 92 when it reaches the position L. Rotation of the main shaft 51 causes the loaded die to advance to position P and the drum is locked in place by the locking mechanism as has been described heretofore. The pressing action then takes place, the interrupting and momentary reversing of the pressing action allowing any air, which may be trapped in the clay, to escape before the final pressure is applied. This feature ensures a solid product of uniform consistency. While a successive tile is being formed the preceding one is advanced to position T where it is trimmed as has been described, and is then discharged upon reaching position D. As loading, pressing, trimming and discharging are substantially simultaneous operations, it is possible to produce tiles with great rapidity, and the various novel features as described herein, all contribute to a uniform product of an extremely high grade.

While I have disclosed a preferred embodiment of my invention, it should be understood that modifications may be made within the spirit and scope of the appended claims.

I claim:

1. In a tile molding machine having a die holder, in combination, a pair of opposed columns having confronting guide portions, a press comprising a housing slidably mounted between said columns and being restrained by said guide portions, a shaft rotatably mounted on said columns and passing through said housing, a roller mounted in said housing, a cam fixedly mounted on said shaft and being so constructed and arranged as to contact said roller and urge said housing along a path between said guide portions, a second roller mounted in said housing and a second cam fixedly mounted on said shaft and being so constructed and arranged as to contact said second roller and urge said housing along said path in a reverse direction.

2. A combination as in claim 1 wherein said second roller is adjustably mounted in said housing.

JOSEPH PESSAGNO.

References Cited in the file of this patent

UNITED STATES PATENTS

| Number | Name | Date |
|---|---|---|
| 988,367 | McHench | Apr. 4, 1911 |
| 1,796,570 | Martin et al. | Mar. 17, 1931 |
| 1,915,475 | Richter | June 27, 1933 |
| 1,937,028 | Lux et al. | Nov. 28, 1933 |